US010328563B2

(12) United States Patent
Valentini

(10) Patent No.: US 10,328,563 B2
(45) Date of Patent: Jun. 25, 2019

(54) MOTOR CONTROL UNIT AND ELECTRONICALLY DRIVEN HAND HELD AND / OR HAND GUIDED TOOL COMPRISING SUCH A CONTROL UNIT

(71) Applicant: Guido Valentini, Milan (IT)

(72) Inventor: Guido Valentini, Milan (IT)

(73) Assignee: Guido Valentini (IT)

( * ) Notice: Subject to any disclaimer, the term of this patent is extended or adjusted under 35 U.S.C. 154(b) by 262 days.

(21) Appl. No.: 15/464,620

(22) Filed: Mar. 21, 2017

(65) Prior Publication Data

US 2017/0282346 A1 Oct. 5, 2017

(30) Foreign Application Priority Data

Mar. 31, 2016 (EP) .................................... 16163289

(51) Int. Cl.
*B24B 23/04* (2006.01)
*B25F 3/00* (2006.01)
(Continued)

(52) U.S. Cl.
CPC .............. *B25F 3/00* (2013.01); *B24B 23/028* (2013.01); *B24B 23/04* (2013.01); *B25F 5/00* (2013.01); *B25F 5/001* (2013.01)

(58) Field of Classification Search
CPC ......... B24B 23/028; B24B 23/04; B25F 5/00; B25F 5/001; B25F 3/00
(Continued)

(56) References Cited

U.S. PATENT DOCUMENTS 4,976,173 A * 12/1990 Yang ......................... B25F 3/00 173/46
5,347,765 A * 9/1994 Mixon, Jr. ............... B23Q 3/12 279/145
(Continued)

FOREIGN PATENT DOCUMENTS

EP 2 072 192 A1 6/2009
EP 2 712 713 A1 4/2014
(Continued)

OTHER PUBLICATIONS

English Language Abstract of EP 2 072 192 A1.
(Continued)

*Primary Examiner* — George B Nguyen
(74) *Attorney, Agent, or Firm* — Ware, Fressola, Maguire & Barber LLP

(57) ABSTRACT

A motor control unit (6) is adapted for controlling an electronically driven hand held and/or hand guided tool (1) featuring a housing (2) and a working element (3) located outside the housing (2), the housing (2) containing an electric motor (29) and a gear mechanism for translating a rotational movement of the motor (29) into an actuation movement of the working element (3). An electrically driven tool (1) is also provided that includes such a control unit (6). In order to reduce tool costs, the control unit (6) is embodied separately from the tool's housing (2). The control unit (6) includes a technique (9; 16) for mechanically attaching the control unit (6) to the housing (2) and a further technique (18; 23, 24) for electrically connecting the control unit (6) to electronic components (19; 29, 31, 32) of the tool (1) for operation of the tool (1).

20 Claims, 6 Drawing Sheets

(51) Int. Cl.
*B24B 23/02* (2006.01)
*B25F 5/00* (2006.01)

(58) Field of Classification Search
USPC .................................................. 451/340–359
See application file for complete search history.

(56) References Cited

U.S. PATENT DOCUMENTS

| | | | | |
|---|---|---|---|---|
| 6,872,121 | B2 * | 3/2005 | Wiesner | B25F 5/00 340/5.6 |
| 7,164,252 | B1 * | 1/2007 | Myers | B25F 5/00 29/560 |
| 8,628,380 | B2 * | 1/2014 | Yang | F16D 43/21 451/354 |
| 2005/0124272 | A1 * | 6/2005 | Watson | B24B 23/04 451/356 |
| 2007/0046110 | A1 * | 3/2007 | Liu | B25F 5/00 310/50 |
| 2008/0230246 | A1 * | 9/2008 | Dollar-Wright | A45D 24/007 173/29 |
| 2011/0081847 | A1 * | 4/2011 | Yang | B24B 23/028 451/359 |
| 2011/0284254 | A1 * | 11/2011 | Moore | B23Q 17/007 173/2 |
| 2014/0242888 | A1 * | 8/2014 | Boeck | B25F 5/00 451/358 |
| 2014/0370743 | A1 * | 12/2014 | Maesnor | H02J 7/0042 439/504 |
| 2015/0135306 | A1 | 5/2015 | Winkler et al. | |
| 2015/0280424 | A1 * | 10/2015 | Leimbach | A61B 17/068 361/18 |
| 2016/0079895 | A1 * | 3/2016 | Miwa | B25F 5/00 318/139 |
| 2016/0107775 | A1 | 4/2016 | Amacker et al. | |
| 2016/0107776 | A1 | 4/2016 | Amacker et al. | |
| 2016/0137323 | A1 | 5/2016 | Amacker | |
| 2016/0159505 | A1 | 6/2016 | Widmer et al. | |
| 2018/0056496 | A1 * | 3/2018 | Rubens | B05C 17/00526 |
| 2018/0104809 | A1 * | 4/2018 | Dyer | B25F 3/00 |

FOREIGN PATENT DOCUMENTS

| | | | |
|---|---|---|---|
| JE | 10 2012 221997 | A1 | 11/2013 |
| JP | S60 99508 | A | 6/1985 |
| WO | 2008/041207 | A2 | 4/2008 |
| WO | WO 2014/179895 | | 11/2014 |

OTHER PUBLICATIONS

English Language Abstract of WO 2014/179895 A2. See Cover page section 57.
English Language Abstract of JP S60 99508 A.
English Language Abstract of DE 10 2012 221997A1.

* cited by examiner

MOTOR CONTROL UNIT AND ELECTRONICALLY DRIVEN HAND HELD AND / OR HAND GUIDED TOOL COMPRISING SUCH A CONTROL UNIT

BACKGROUND OF THE INVENTION

1. Field of Invention

The present invention refers to a motor control unit adapted for controlling an electronically driven hand held and/or hand guided tool. The tool comprises a housing and a working element located outside the housing. The tool's housing contains an electric motor and a gear mechanism for translating a rotational movement of the motor into an actuation movement of the working element.

Further, the invention refers to an electronically driven hand held and/or hand guided tool comprising a housing and a working element located outside the housing. The housing contains an electric motor and a gear mechanism for translating a rotational movement of the motor into an actuation movement of the working element. The tool comprises a motor control unit.

2. Description of Related Art

Electronically driven hand held and/or hand guided tools are well known in the prior art. They are also referred to as electric power tools or hand guided electric power tools. These tools comprise in particular grinders, polishers, sanders, glazing machines, planers, joining machines, edge trimmers, vertical routers, saws, scouring machines, drills, screwdrivers, and mixers. Depending on the type of tool and on the design of the gear mechanism and the working element, the working element can perform a rotational, an orbital, a random orbital, a roto-orbital, a planetary or a linear actuating movement.

In conventional electronically driven hand held and/or hand guided tools the control unit is an integral part of the tool's electronic components and fixedly located within the tool's housing. Each tool has its own control unit specifically adapted to the type of tool in terms of which sensor signals to receive from the motor, what maximum rotational speed of the working element can be reached, applied control strategy, etc. In particular, control parameters for controlling the tool and its motor, respectively, are preset to certain predefined values for the specific type of tool the control unit is adapted for. An electric cable for connecting the control unit and the other electronic components of the tool to an electric mains power supply enters the tool's housing, preferably at the rear part of the housing facing the user when operating the tool. Any power transformer means for transforming the energy originating from the mains power supply into energy suitable for the tool's electronic components and for operating the tool can be located inside the tool's housing, too. If the tool is provided with a switch for activating and deactivating the tool, this would be located within the housing and accessible by the user from outside the housing. If the tool comprises an actuator for setting a desired speed of the electric motor of the tool, this would be located within the housing, too.

In the prior art a separate control unit has to be provided for each tool due to the fact that the control unit is an integral part of the known tools. The control unit constitutes an important part of the tool in terms of proper functioning of the tool and in financial terms as well. Therefore, known tools are rather expensive. Furthermore, it almost impossible to provide existing tools with new control units comprising updated strategies of tool control and/or new energy saving techniques. The only possibility of providing existing tools with an updated control strategy would be to update control software of a control unit's microcontroller. However, this would require an interface to the microcontroller accessible from outside the tool and appropriate external hardware and software means for programming the microcontroller with the updated control software. Providing existing tools with new energy saving techniques is not possible at all because these new techniques usually require amended hardware components of the control unit.

SUMMARY OF THE INVENTION

Therefore, it is an object of the present invention to make existing electronically driven hand held and/or hand guided tools cheaper and more flexible in terms of providing them with updated strategies of tool control and/or new energy saving techniques.

This object is achieved by the control unit comprising the features of claim 1. In particular the control unit is embodied separately from the tool's housing and the control unit comprises means for mechanically attaching the control unit to the tool's housing and means for electrically connecting the control unit to electronic components of the tool for operation of the tool.

Hence, according to the present invention the control unit is embodied separately from the tool's housing. Preferably, the control unit comprises its own casing. At least that part of the control unit's casing visible from the outside when the control unit is attached to the tool is completely closed or sealed in order to avoid humidity and/or dust entering the casing during operation of the tool. However, it would be possible to provide the casing with one or more openings pneumatically interacting with one or more corresponding openings in the tool's housing when the control unit is attached to the tool. In this manner a cooling air flow provided in the tool's housing, e.g. for cooling the electric motor, could enter the internal part of the control unit's casing, thereby cooling the control unit's electronic components. The cooling air flow could exit the control unit's casing through one or more appropriate venting openings preferably provided in that part of the casing, which is visible from the outside when the control unit is attached to the tool.

The control unit is attached to the tool by locating the control unit in a predefined receiving section of the housing. The receiving section is adapted to receive at least part of the control unit. The receiving section could be embodied as a recess in the housing. When located in the housing's receiving section the control unit can be secured to the housing by means of appropriate securing means. These can provide for a manual or an automatic securement of the control unit to the housing. For example, the securing means can comprise a snap-action connection device, a latch connection device, a magnetic holding device and/or a manually activated securing device for holding the control unit in respect to the tool's housing, when the control unit is attached to the tool.

Preferably, insertion and removal of the control unit should be easy, fast and straight-forward. Nonetheless, the control unit should be adapted to be connected safely to the housing of the tool. In particular, a merely partial insertion of the control unit into the receiving section should be avoided or at least signaled to the user. At the same time, it should be avoided that a control unit inserted into the receiving section undesirably falls out of the receiving section during operation of the tool, for example, caused by a shock or vibrations. For this reason it is suggested that the tool and/or the control unit are equipped with means for securing the control unit in the receiving section of the housing and for releasing it from the receiving section upon a defined user activity only, and not just upon shock or vibrations acting on the control unit.

The securing means could comprise, for example, a permanent magnet located in the housing or in the control unit. The corresponding counter-part, i.e. the control unit (with the permanent magnet located in the housing) or the housing (with the permanent magnet located in the control unit), are provided with corresponding magnetic elements, for example a metal plate, which is magnetically attracted by the permanent magnet, thereby securing the control unit to the housing.

Alternatively, the securing means could comprise a manually activated mechanical slider provided at the outside of the tool's housing and the control unit, respectively. After fully inserting the control unit into the receiving section of the housing, the slider can be sled into a locking position in order to secure the control unit in the receiving section. Before removing the control unit the slider can be sled into an unlocked position, thereby releasing the control unit from the receiving section.

Upon completed attachment of the control unit to the tool's housing, an electrical connection between the control unit and the tool's electronic components is automatically established. No additional user activity for establishing the electrical connection is required. The electrical connection can be realized by regular electrical contacts provided in the control unit and adapted for interacting with corresponding electrical contacts at the tool's housing, preferably within the housing's receiving section, when the control unit is attached to the tool. Alternatively, the electrical connection can be realized contact-free, for example by transmitting electric signals between the control unit and the tool's electric components by means of an inductive or capacitive coupling or by means of an optical (e.g. infrared, IR) or a radio coupling. Preferably, at least the transmission of electric energy for operating the tool's motor is transmitted from the control unit to the tool by means of regular contacts or an inductive coupling. Electric signals, e.g. sensor signals from one or more sensors of the tool or for controlling the operation of the tool and the electric motor, respectively, can be transmitted in any desired way.

Preferably, the means for electrically connecting the control unit to the tool comprise contacts for connecting the tool to an electric power supply, at least one contact for receiving an electric signal from the tool for the detection of the type of tool, to which the control unit is attached, and/or at least one contact for receiving one or more sensor signals from one or more sensors of the tool. The sensors are, for example, a hall sensor for determining the current rotational position of a motor shaft, an acceleration sensor for determining vibrations currently acting on the tool, a temperature sensor for determining the current temperature inside the tool's housing, in particular near the electric motor. It is suggested that the electric motor is a 3-phase brushless direct current (BLDC) motor and that on contact is provided between the control unit and the tool for each phase of the motor.

The present invention has the advantage that one control unit can be used for operating a plurality of different tools, one at a time. Hence the price for the tools could be significantly reduced because they would no longer comprise an integral control unit. Furthermore, applying updated strategies of tool control and/or new energy saving techniques to existing tools can be easily realized by simply swapping the control unit to an updated and/or newer control unit and using that control unit with the tools in future. The updated or new control unit could be provided with a corrected or updated control software. With the present invention the user has the possibility to bring his entire machinery of hand held and/or hand guided tools operable with the control unit up to date with very little costs by simply acquiring a single new and/or updated control unit. Furthermore, the tools without the integrated control unit require much less space for storage at the user's site as well as at the manufacturer's and vendor's site and during transport. An additional advantage is the fact that the user can hold available a number to tools of the same type but equipped with different working elements, e.g. sanders each provided with sanding paper of different grain size or contour or polishers each provided with polishing pads of different material, contour and/or softness. During work on a vehicle's or a boat's body or during detailing of a vehicle's or boat's varnish the user can simply switch between different working elements by choosing the desired tool and attaching the control unit to it. The user no longer has to change the working element of the tool he is currently working with, which can be rather complicated and time-consuming.

According to a preferred embodiment of the invention, it is suggested that the control unit comprises an electric cable for connecting the control unit to an electric mains power supply. In this manner, the control unit can be left connected to the mains power supply even when switching from one tool to another. If the electric cable was part of the tool, it would have to be disconnected from the mains power supply each time the control unit is attached to a different tool. Furthermore, costs for the tools can be further reduced, because only one electric power supply cable is required for a plurality of tools of the same or of different type.

It is further suggested that the control unit comprises power transformer means for transforming the energy originating from the mains power supply into energy suitable for operating the tool. The power transformer means are preferably located inside the control unit's casing and can comprise, for example, but are not limited to: one or more printed circuit boards (PCBs), coils of metal wire for realizing an inductive transformer, a programmable microprocessor, electronic storage means, relays, electric switches, diodes, transistors, triacs and other electronic components such as resistors, capacitors and inductances. All these electronic components necessary for power transformation are located within the casing of the control unit. Preferably, the control unit is adapted for receiving an input voltage of 100 V to 380 V, preferably 110 V or 230 V, and an input frequency of 50 Hz to 60 Hz. The output voltage preferably ranges between 12 V and 24 V, preferably 18 V. Again, this allows a further reduction of costs for the tools, because only one power transformer means is required for a plurality of tools of the same or of different type.

Furthermore, it is suggested that the control unit comprises a switch for activating and deactivating the tool, to which the control unit is attached. According to another embodiment of the invention, the control unit comprises an actuator for setting a desired speed of the electric motor of the tool, to which the control unit is attached. Again, this has the advantage that the costs for the tools can be further reduced, because only one switch and one actuator is required and can be used for a plurality of tools of the same or of different type. Furthermore, this has ergonomic advantages for the user because the handling of different tools in terms of activation and deactivation as well as in terms of speed control is the same for all tools operated with the same control unit.

According to a preferred embodiment of the present invention it is suggested that the control unit comprises means for automatically detecting the type of tool, to which the control unit is attached, and means for automatically adjusting control parameters based on the detected type of tool.

According to this embodiment the control unit can be used for various tools of different type, in particular with different technical characteristics in terms of mechanical properties (e.g. maximum rotational speed of the working element, maximum acceleration of the working element), electrical properties (e.g. nominal voltage, nominal current, maximum power consumption), type of control signal determined by the control unit for driving the electric motor (e.g. PWM-signal, continuous analogue signal). When attaching the control unit to the tool, the control unit automatically determines the type of tool it is connected to. After having determined the type of tool, the control unit procures the corresponding mechanical and/or electrical properties of the tool and adapts the control parameters accordingly. Alternatively the detection of the tool type could also comprise the transmission of the respective mechanical and/or electrical properties from the tool to the control unit. Adapting the control parameters also comprises adaptation of closed loop control strategy, limiting or enhancing the maximum rotational speed of the motor depending on the desired speed of the working element, adapting the output voltage and/or current, adapting the control signal for the motor, or the like. The detection of the type of tool can be realized electrically, mechanically, magnetically, optically, inductively, by means of a capacitance or in any other way.

An electrical detection of the type of tool could be realized by transmitting an electrical signal from the tool to the control unit, the signal having a certain value or certain characteristics indicative of the type of tool. A mechanical detection could be realized by interacting mechanical coding means located at the tool's housing, preferably at the housing's receiving section, and at the control unit's casing, in particular at that part of the casing which is received by the receiving section when the control unit is attached to the tool. For example, the housing could comprise a protrusion extending towards the control unit attached to the tool, wherein the length of the protrusion varies depending on the type of tool. The protrusion interacts with a switching element located at the control unit. Depending on the length of the protrusion the switching element adopts a certain switching position. The control unit can determine the switching position of the switching element and, hence, the type of tool to which the control unit is connected. The switching position can be determined in any desired way (e.g. electrically, optically, magnetically, inductively, by capacitance, etc.). The switching element could be, e.g. a two-point switch or an adjustable resistance. The number of different switching positions of the switching element corresponds to the number of different types of tools which can be detected by the control unit. Of course, the housing could be provided with a plurality of key-like protrusions interacting with a plurality of switches. Furthermore, the protrusions could also be provided at the control unit and the switches could make part of the tool.

A magnetic detection of the type of tool could be realized by providing the tool or the housing with a magnet creating a certain magnetic flux value indicative of the type of tool. The magnetic flux value can be detected by the control unit by one or more appropriate sensors. An optical detection of the type of tool could be realized by transmitting a coded optical signal from the tool to the control unit, the code being indicative of the type of tool. The coded optical signal could be transmitted simply by emitting the optical signal by means of a light source, e.g. a LED, located at the tool and the housing, respectively, and by receiving the emitted signal by means of a light receiver, e.g. a photo diode, located at the control unit.

Preferably, when the control unit is attached to the tool, the form of the control unit's casing is such that it resumes the form of the tool's housing near the receiving section provided in the housing for receiving at least part of the control unit. According to this embodiment the design of the control unit's casing is such that—after insertion into the receiving section—it nicely and neatly fits into the overall aesthetic appearance and design of the tool and its housing, respectively. It is possible that at least part of the casing of the control unit constitutes part of the tool's housing when the control unit is completely attached to the tool.

Depending on the type of tool, the control unit's casing can be formed in order to meet specific needs of the tool and its user. For example, in the case of a hand-guided electronic polisher or sander the control unit's casing can be formed like a handle or grip in order to allow the user of the tool to easily grip and safely hold the power tool during its operation. Furthermore, the casing of the control unit could be provided with output means, such as a small display or status lights, in order to provide the user of the tool with information on the current operation status of the tool and/or the control unit, for example, with information on a correct and complete (mechanical and/or electrical) connection of the control unit to the tool.

According to another preferred embodiment of the invention it is suggested that the tool and/or the control unit comprise coding means for assuring that the tool can only be operated with such a control unit which is actually intended and approved for use with the tool. The same or different coding means could be provided for assuring that the control unit is correctly (in particular fully) inserted into the receiving section of the housing. The coding means suggested here could be of the mechanical, the electronic, the magnetic, the optical or any other type.

Mechanical coding means could inhibit the insertion of the control unit into the receiving section of the tool's housing due to a mismatch in the form of the recess and the form of the control unit. Electronic coding means could electronically determine, whether the mechanically inserted control unit is actually intended and approved for use with the tool and following this determination could allow operation of the tool (if the correct control unit has been inserted) or inhibit operation of the tool (if the control unit is not of the type intended or approved for use with the tool). For example, an electronic read switch, a Hall-Effect-sensor or a micro-switch could be provided in the receiving section and/or in the control unit. Only a correct and approved control unit will activate the switch or sensor, thereby allowing proper operation of the tool.

The same or different coding means could be provided and adapted for assuring that the control unit is correctly (fully) inserted into the receiving section. These coding means could comprise for example, but not limited to, an electronic read switch, a Hall-Effect-sensor or a micro-switch and could be provided in the housing, the receiving section, and/or the control unit.

The object of the present invention is also achieved by an electronically driven hand held and/or hand guided tool comprising the features of claim 10. In particular the control unit is embodied separately from the tool's housing and the control unit comprises means for mechanically attaching the control unit to the tool's housing and means for electrically connecting the control unit to the tool for operation of the tool. The control unit is preferably embodied according to the present invention.

According to a preferred embodiment of the invention, it is suggested that the tool's housing has a recess for receiving the control unit and the control unit has a casing, the form of at least part of the casing corresponding to the form of the recess in order to allow insertion of the at least one part of the control unit's casing into the recess. When the control unit is completely attached to the housing, there is preferably an almost seamless transition between the control unit's casing and the tool's housing along the border of the recess.

Preferably the electronically driven hand held and/or hand guided tool is one of a grinder, a polisher, a sander, a glazing machine, a planer, a joining machine, an edge trimmer, a vertical router, a saw, a scouring machine, a drill, a screw-driver, and a mixer. Depending on the type of tool and on the design of the gear mechanism and the working element, the working element can perform a rotational, an orbital, a random orbital, a roto-orbital, a planetary or a linear actuating movement.

BRIEF DESCRIPTION OF THE DRAWING

Further features and advantages of the present invention will be explained in more detail in the following specification taking into consideration the drawings. The figures show.

DETAILED DESCRIPTION OF THE BEST MODE OF THE INVENTION

Figure 1:
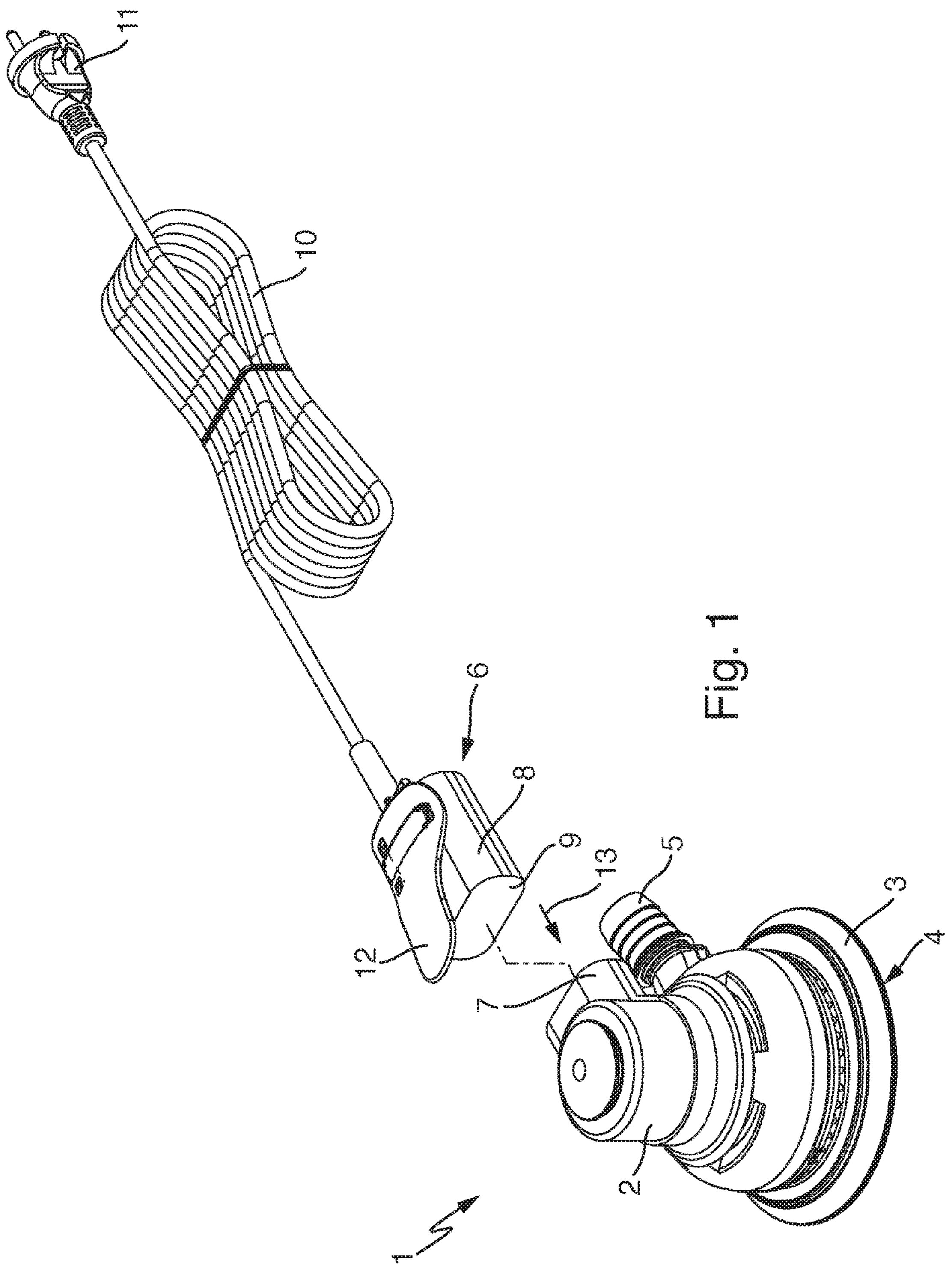
FIG. 1 a perspective view of an electric power tool with a detachable motor control unit according to the present invention.

FIG. 1 shows an example of an electronically driven hand held and/or hand guided tool according to the present invention. In this embodiment the tool is embodied as a polisher. The polisher in its entirety is designated with reference sign 1. The following description is directed to the preferred embodiment of FIG. 1, i.e. to a polisher 1, its construction and its functioning. Of course, the following description would apply to any other type of electronically driven hand held and/or hand guided tool according to the present invention just the same. In particular, the tool according to the present invention could also be embodied as a grinder or a sander.

The polisher 1 comprises a housing 2, preferably made of a rigid plastic material. Of course, at least part of the housing 2 could be made of any other material than rigid plastic, too, for example resilient plastic material, rubber, metal or carbon fiber. In particular, the housing 2 could comprise a resilient material where a user would grip and hold the tool in order to enhance surface feel and haptic. Furthermore, the polisher 1 comprises a working element 3 which in this embodiment performs a random orbital actuating movement, when the polisher 1 is turned on. Of course, the polisher's working element 3 could perform any other type of actuating movement, too, for example a mere rotational, an orbital, a roto-orbital, a planetary or a linear actuating movement. Furthermore, the type of actuating movement performed by the working element 3 may also depend on the type of tool. A polishing pad can be releasably connected to a bottom surface 4 of the working element 3, for example by means of a hook-and-loop connector (or Velcro®), a clamping mechanism or a glued surface.

In the embodiments shown in the figures the working element 3 has a round circumference. Of course, the working element 3 could have any other form instead, for example a rectangular or a triangle form.

The polisher 1 is provided with an electric motor (not shown in FIG. 1) located inside the housing 2. The motor is preferably a brushless direct current (BLDC) motor. During operation of the polisher 1 a rotational movement of a motor shaft is transformed into the desired actuating movement of the working element 3 by means of an appropriate gear mechanism (not shown in FIG. 1) also located inside the housing 2. Furthermore, the polisher 1 is provided with a nozzle 5 for connection to the suction side of a dust suction device (e.g. a vacuum cleaner). During operation of the polisher 1 dust laden air is aspired by the dust suction device from a working area, where the working element 3 or the polishing pad, respectively, touches and works the surface of a workpiece. Thus, the working area and the air surrounding the polisher 1 are kept largely free of dust and other residual particles (e.g. abrasive or polishing paste, etc.).

A motor control unit 6 is embodied separately from the housing 2 and the rest of the polisher 1. The housing 2 is provided with a receiving section 7 for attaching the control unit 6 to the housing 2. The control unit 6 comprises a casing 8, preferably made of the same material as the housing 2, with an attachment section 9. The attachment section 9 is adapted to interact with the receiving section 7 of the housing 2 in order to releasably fix the control unit 6 to the housing 2. The form and design of the attachment section 9 depends on the form and design of the receiving section 7, in order to allow interaction between the two. In particular, the receiving section 7 and the attachment section 9 are designed such that a mechanical connection is established between the attachment section 9 of the casing 8 of the control unit 6 and the receiving section 7 of the housing 2 of the polisher 1. Furthermore, the receiving section 7 and the attachment section 9 are designed such that when establishing the mechanical attachment an electrical connection is automatically established between the electronic components of the control unit 6 and the polisher 1.

The control unit 6 is further provided with an electric cable 10 for connecting the control unit 6 and its electronic components, respectively, to an electric mains power supply by means of a plug connector 11. The control unit's electronic components may comprises power transformer means for transforming the energy originating from the mains power supply (e.g. 110V or 230V) into energy suitable for operating the polisher 1, its electronic components and the electric motor, respectively (e.g. 12V, 18V, 24V). The control unit 6 may comprise a switch 12 for activating and deactivating the polisher 1, to which the control unit 6 is attached. The switch 12 comprises an actuating lever, which can be actuated by the palm of a user's hand pressing the lever downwards and thereby actuating the switch 12. Finally, it is possible that the control unit 6 is provided with an actuator for setting a desired speed of the electric motor of the polisher 1, to which the control unit 6 is attached.

There are many different ways how to releasably attach the control unit 6 to the housing 2. The attachment section 9 of the casing 8 can be designed such that it can be received by the receiving section 7 of the housing 2 when the control unit 6 is attached to the housing 2 (see FIG. 5). Alternatively, the attachment section 9 of the casing 8 could be designed such that it can receive the receiving section 7 of the housing 2 (see FIGS. 4 and 6). According to these embodiments the control unit 6 is attached to the housing 2 in an insertion movement represented by arrow 13. According to another embodiment, the control unit 6 can be attached to the housing 2 in an attachment movement 14 running essentially perpendicular to the insertion movement 13 (see FIGS. 2 and 3).

Figure 2:
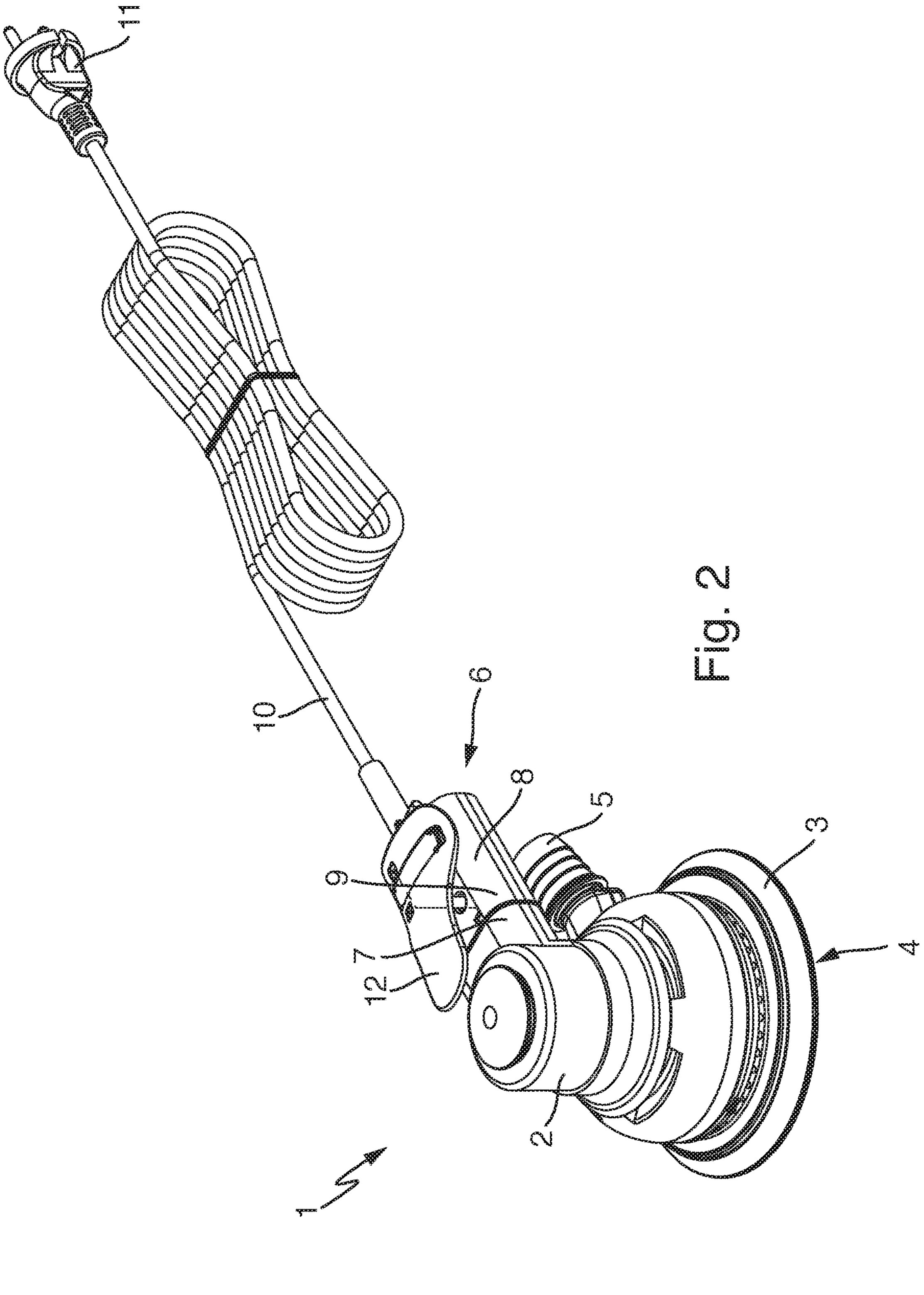
FIG. 2 a perspective view of the electric power tool of FIG. 1 equipped with the control unit attached to the tool according to a preferred embodiment of the present invention.
Figure 3:
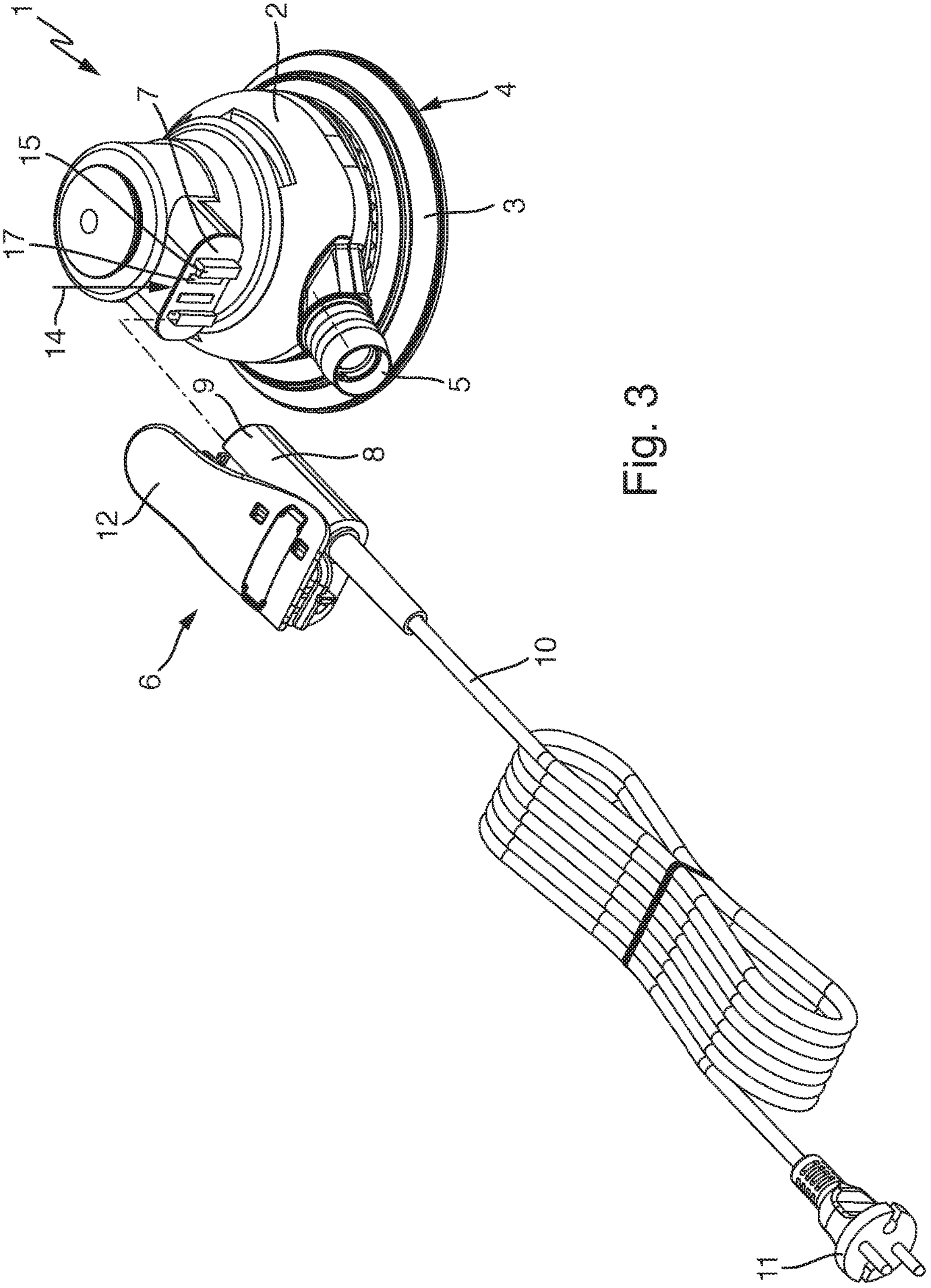
FIG. 3 a perspective view of the electric power tool of FIG. 1 with the detachable motor control unit according to a preferred embodiment of the present invention.

The receiving section 7 as well as the attachment section 9 is provided with means for mechanically attaching the control unit 6 to the housing 2. In the embodiment of FIGS. 2 and 3 the attachment is performed by means of a lateral sliding movement 14 of the control unit 6 in respect to the housing 2. The sliding movement 14 runs essentially perpendicular to a longitudinal extension of the casing 8 and to the extension of working surface 4 and essentially parallel to an actuating movement of the actuating lever of the switch 12. The mechanical attachment means comprise two guiding rails 15 running parallel to one another in an essentially vertical direction. In particular, the extension of the guiding rails 15 is parallel to the attachment movement 14. The guiding rails 15 have an essentially "L"-shaped cross section. The control unit 6 is provided with correspondingly formed channels 16 adapted to receive the guiding rails 15 (see FIG. 7). Preferably, the control unit 6 is attached from top to bottom to the housing 2 (see direction of attachment movement 14). The bottom of at least one of the guiding rails 15 or the top of at least one of the channels 16 is provided with an abutment surface, in order to assure a predefined position of the control unit 6 in respect to the housing 2 when the two are attached to one another. Of course, it would be possible that the guiding rails 15 are provided at the attachment section 9 of the control unit 6 and the corresponding channels 16 at the receiving section 7 of the housing 2. In that case the top of at least one of the guiding rails 15 or the bottom of at least one of the channels 16 would be provided with the abutment surface. Instead of the guiding rails 15 and the channels 16 any other type of mechanical connecting means could be used in order to perform the attachment by means of a lateral sliding movement of the control unit 6 in respect to the housing 2.

Furthermore, the means for mechanically attaching the control unit 6 to the housing 2 can comprise appropriate securing means for securing the control unit 6 to the housing 2 after attachment thereto. For example, the securing means can comprise a snap-action connection device, a latch connection device, a magnetic holding device and/or a manually activated securing device. Of course, any other type of securing means can be used, too.

The receiving section 7 as well as the attachment section 9 is provided with means for electrically connecting the control unit 6 to the housing 2. The electrical connecting means serve for transmitting electric energy from the control unit 6 to the electric components of the tool 1, for transmitting control signals from the control unit 6 to the electric components of the tool 1 and/or for transmitting sensor signals from the tool 1 to the control unit 6. To this end the tool 1 can be provided with appropriate sensors for determining the current operational status of the tool 1 and its electric components. For example, the tool 1 can be provided with a Hall-Effect sensor for determining the current rotational position of the electric motor and/or a rotational speed of the motor and/or the working element 3. Other sensors could be provided in the tool 1 for determining a pressure with which the tool 1 is pressed onto the surface of the workpiece. The control unit 6 can use the sensor signals for effecting the desired motor control.

Figure 7:
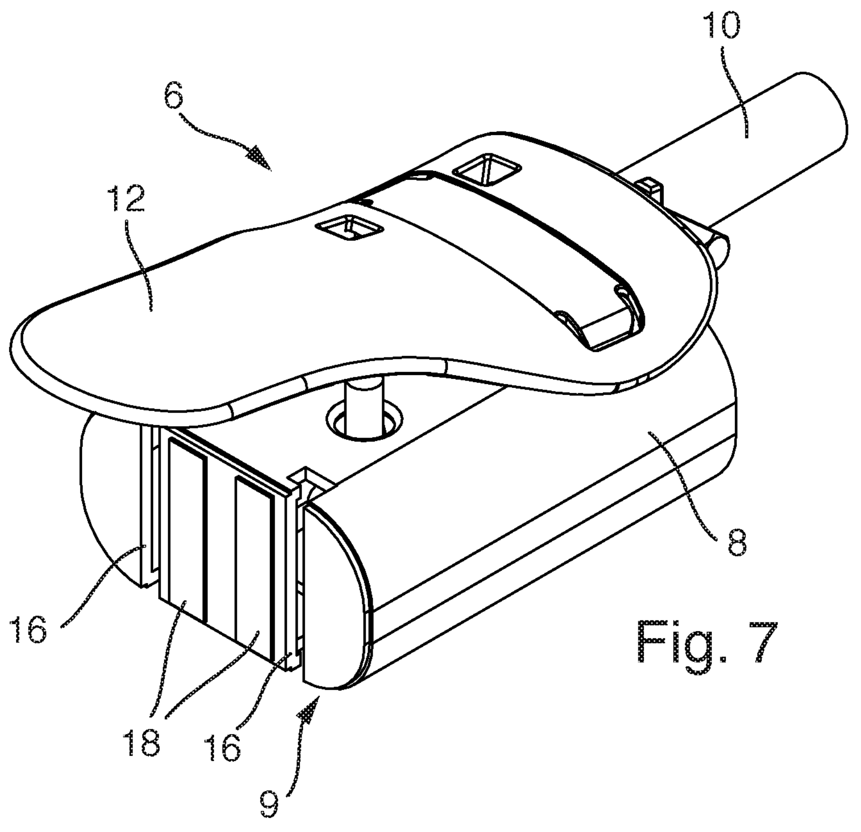
FIG. 7 a perspective view of the motor control unit according to a preferred embodiment of the present invention.

In the embodiment of FIGS. 2, 3 and 7 the electrical connecting means comprise contact elements 17 and 18 located at the receiving section 7 and the attachment section 9, respectively (see FIGS. 3 and 7). The contact elements 17, 18 enter into contact with one another when the control unit 6 is attached to the housing 2. In the figures only two contact elements 17, 18 are shown for each of the receiving section 7 and the attachment section 9. Of course, it would also be possible to provide more than the two contact elements 17, 18 at each of the receiving section 7 and the attachment section 9. The contact elements 17, 18 at least at one of the receiving section 7 and the attachment section 9 can be spring-loaded in order to assure a safe and reliable electrical contact between corresponding contact elements 17, 18.

Figure 4:
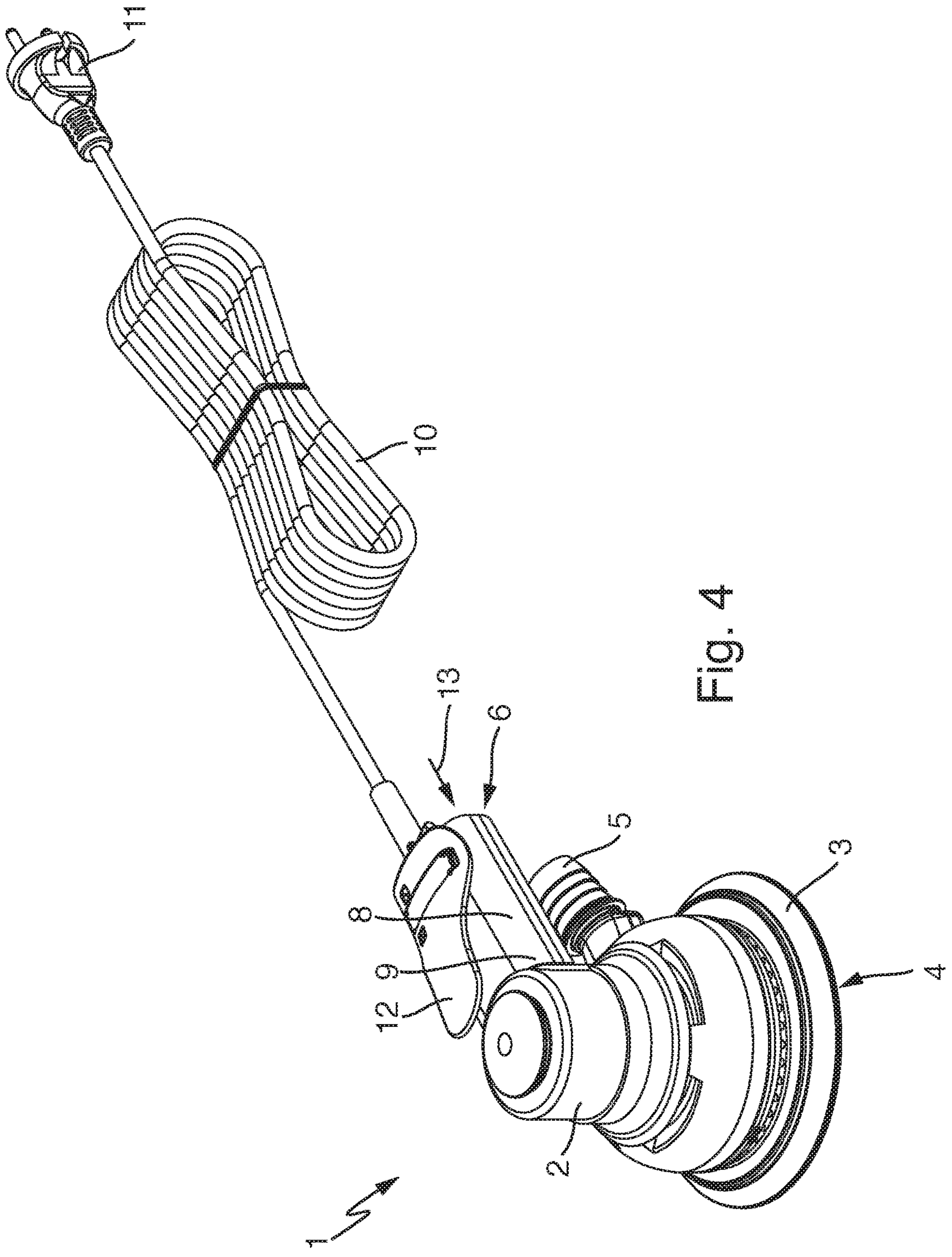
FIG. 4 a perspective view of the electric power tool of FIG. 1 equipped with the control unit attached to the tool according to another preferred embodiment of the present invention.
Figure 6:
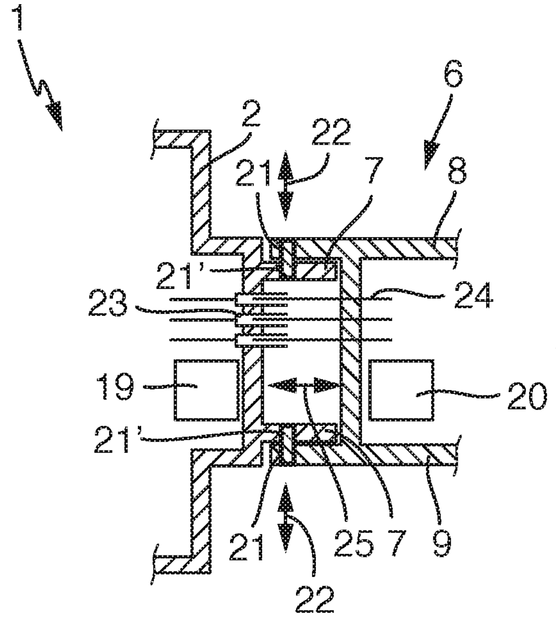
FIG. 6 a sectional view of part of the electric power tool of FIG. 4 equipped with the control unit attached to the tool according to another preferred embodiment of the present invention.

In the embodiment of FIGS. 4 and 6 the attachment of the control unit 6 to the housing 2 is performed differently than in the embodiment of FIGS. 2, 3 and 7. In particular, in FIGS. 4 and 6 the control unit 6 is attached to the housing 2 along an insertion movement 13. The insertion movement 13 runs essentially parallel to a longitudinal extension of the casing 8 and to the extension of working surface 4 and essentially perpendicular to an actuating movement of the actuating lever of the switch 12. The attachment section 9 of the casing 8 of the control unit 6 is formed and designed such that it can receive the receiving section 7 of the housing 2 of the polisher 1. The receiving section 7 and/or the attachment section 9 can be provided with appropriate corresponding guiding members in order to facilitate insertion and guidance of the control unit 6 and the housing 2 in respect to one another.

In FIG. 6 the electronic components of the tool 1 are schematically shown and designated with reference sign 19. Similarly, the electronic components of the control unit 6 are schematically shown and designated with reference sign 20. For attachment of the control unit 6 to the housing 2 the control unit 6 the receiving section 7 is inserted into the attachment section 9. The receiving section 7 neatly fits into the recess of the attachment means 9 leaving almost no gaps or clearances between the housing 2 and the casing 8. Additionally, appropriate sealing means can be provided between the housing 2 and the casing 8.

The control unit 6 is secured to the housing 2 by means of securing means 21 interacting between the receiving section 7 and the attachment section 9. The securing means 21 comprise sliders, which are seated within the walls of the attachment section 9 forming the recess for receiving the receiving section 7. The sliders 21 the can be moved in a direction indicated by arrows 22 between a locking position and a clearing position. In the locking position the sliders 21 interact with cavities or holes 21' located in the housing 2 and the receiving section 7, respectively. The cavities or holes 21' are located opposite to the corresponding sliders 21 when the housing 2 is fully inserted into the control unit 6. When the sliders 21 are in their locking position the control unit 6 cannot be detached from the housing 2. The sliders 21 can be brought into their locking position either automatically (e.g. spring loaded) or manually (e.g. by the user of the tool 1). In order to detach the control unit 6 from the housing 2 the sliders 21 are brought into their clearing position by sliding them outwards, i.e. away from the receiving section 7, so they no longer interact with the cavities or holes 21' of the receiving section 7. Movement of the sliders 21 into their clearing position can also be effected automatically or manually. With the sliders 21 in the clearing position the control unit 6 can be easily detached from the housing 2.

In the embodiment of FIGS. 4 and 6 the electrical connection means are embodied differently than in the embodiment of FIGS. 2, 3 and 7. As can be clearly seen in FIG. 6, the electrical connection means comprise a plurality of socket members 23 and a plurality of corresponding pin members 24. When introducing the receiving section 7 into the recess of the attachment section 9 the pins 24 automatically intrude into the sockets 23, thereby achieving a safe and reliable electrical connection between the electronic components 19, 20 of the control unit 6 and the tool 1, respectively. The embodiment shown in FIG. 6 comprises three separate electrical connections, e.g. one for each phase of the tool's electric motor. Control signals and sensor signal could also be transmitted between the tool 1 and the control unit 6 by means of electrical contacts similar to the contacts 23, 24. However, in this embodiment the control signals and/or sensor signals are transmitted by means of a contactless data transmission connection 25, for example a radio connection, an optical connection, an inductive or a capacitive connection. In the embodiment shown in FIG. 6 the connection 25 is a radio connection. To this end the tool 1 as well as the control unit 6 and their electronic components 19, 20, respectively, are provided with appropriate radio transmission means.

Figure 5:
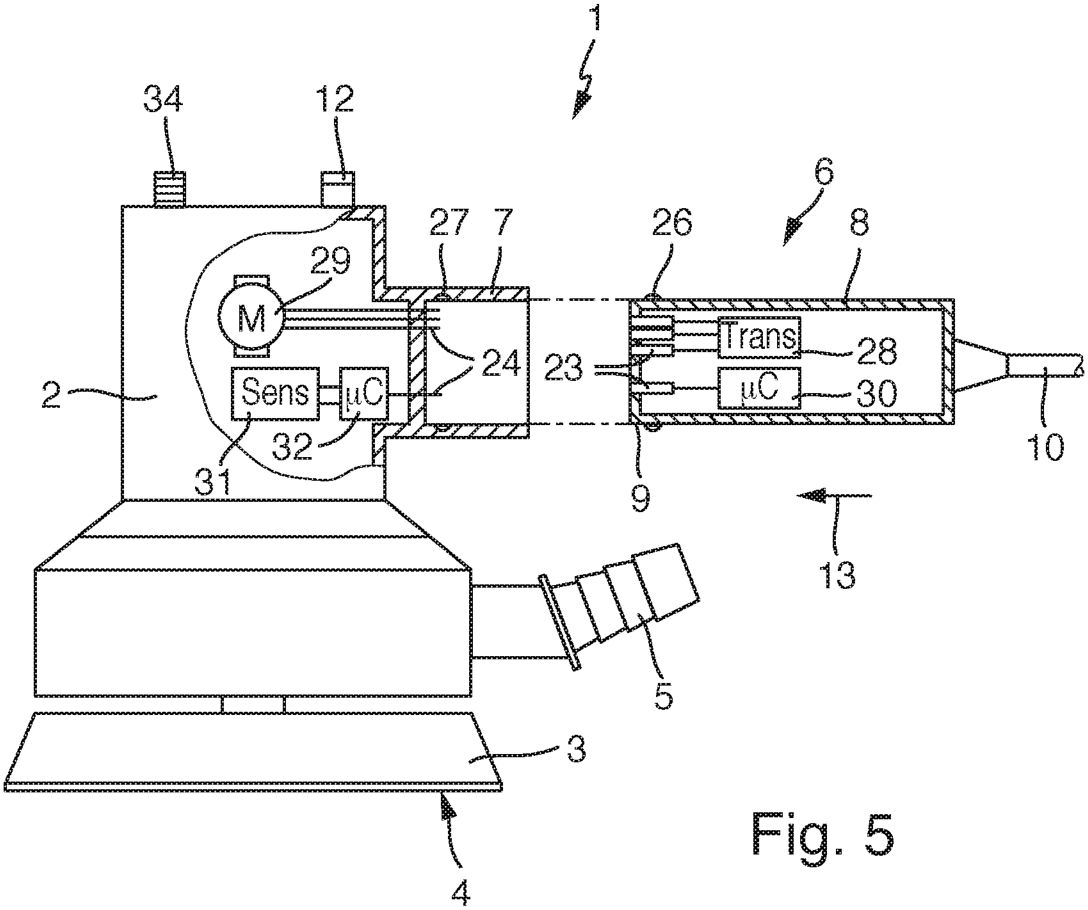
FIG. 5 a partly sectional view of the electric power tool of FIG. 1 with the detachable motor control unit according to a preferred embodiment of the present invention.

According to yet another embodiment shown in FIG. 5 the attachment of the control unit 6 to the housing 2 of the tool 1 is also provided by means of a linear attachment movement 13. The receiving section 7 of the tool's housing 2 and the attachment section 9 of the control unit's casing 8 are designed such that the receiving section 7 forms a recess for receiving the attachment section 9. Hence, in this embodiment the casing 8 of the control unit 6 or at least part of it is inserted into the receiving section 7 of the housing 2. The mechanical attachment means comprise securing means for holding the control unit 6 attached to the housing 2. The securing means comprise flexible or resilient protruding elements 26 at outside surfaces of the attachment section 9 and corresponding cavities or holes 27 at inside surfaces of the recess formed by the receiving section 7. When inserting the control unit 6 into the recess formed by the receiving section 7 the protruding elements 26 are automatically pressed inwardly by the inner surfaces of the walls of the receiving section 7 forming the recess. As soon as the control unit 6 is completely inserted into the receiving section 7, the protruding elements 26 are aligned with the cavities 27 and automatically move into the cavities 27 thereby securing the control unit 6 to the housing 2. In order to detach the control unit 6 from the housing 2 a considerable amount of force has to be applied to the control unit 6 in a direction opposite to the attachment movement 13. Due to inclined lateral surfaces of the cavities 27, the protruding elements 26 are automatically moved inwardly permitting detachment of the control unit 6 from the housing 2.

Furthermore, according to this embodiment the electrical connection between the control unit 6 and the rest of the tool 1 is effected by socket members 23 and corresponding pin members 24. A plurality of sockets 23 is located at the attachment section 9 and a plurality of pins 24 is located at the receiving section 7. The contacts 23, 24 serve for transmitting electric energy for the electronic components of the tool 1 as well as for transmitting sensor signals and control signals between the control unit 6 and the tool 1. In particular, there are three separate contacts 23, 24 adapted for transmitting electric energy from a transformer 28 located in the control unit 6 to the electric motor 29 located in the tool 1. Further, there is one contact 23, 24 adapted for transmitting control signals from a microcontroller 30 located in the control unit 6 to one or more electronic components of the tool 1 and for transmitting sensor signals from one or more sensors 31 located in the tool 1 to one or more electronic components of the control unit 6, in particular to the microcontroller 30. The tool 1 can be provided with a microcontroller 32 for processing control signals and/or sensor signals. Furthermore, the microcontroller 32 could be adapted to transmit to the control unit 6 a signal indicative of the type of tool 1. Transmission of the tool type signal could be realized by means of a conventional electrical contact or contactless (by radio, optically, inductively, by capacitance, etc.).

Further, in the embodiment of FIG. 5, the switch 12 for activating and deactivating the electric motor 29 of the tool 1 is located at the tool 1. In this case, the control unit 6 could be provided with an actuating lever for the switch 12, similar to the one shown in FIGS. 1 to 4. When the control unit 6 is attached to the housing 2 actuating the actuating lever by a user will provoke actuation of the switch 12. An actuator 34 for setting a desired speed of the electric motor 29 of the tool 1 is also provided at the tool 1.

Preferably, the external form of the casing 8 of the control unit 6 is such that the casing 8 resumes the form of the housing 2 of the tool 1 in the region of the receiving section 7 and/or attachment section 9, when the control unit 6 is fully attached to the tool 1. Hence, the form of the housing 2 is continued by the external form of the attachment section 9 of the casing 8. This means that the casing 8 of the control unit 6 and the housing 2 both influence the polisher's design. Both the housing 2 as well as the casing 8 provide for the appealing design of the polisher 1, when the control unit 6 is attached to the housing 2.

Figure 8:
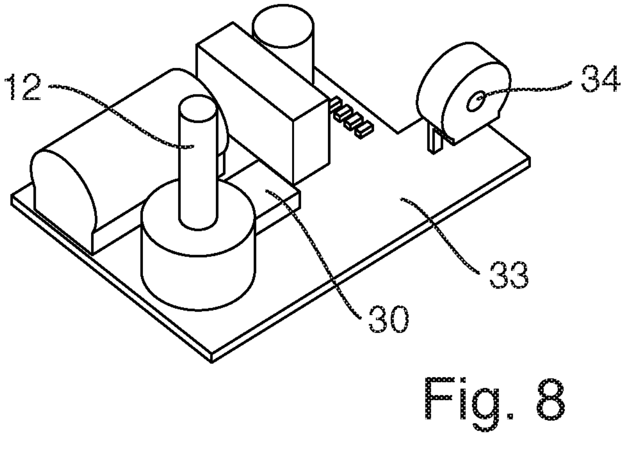
FIG. 8 internal parts of the motor control unit according to a preferred embodiment of the present invention.

FIG. 8 shows some of the electronic components located in the casing 8 of the control unit 6. Among others, the control unit 6 comprises a printed circuit board (PCB) 33 comprising a number of conductive paths (not shown) interconnecting the electronic components with one another according to a predefined circuit diagram. On an exemplary basis FIG. 8 shows the switch 12 for activating/deactivating the electric motor 29, the microcontroller 30 and an actuator 34 in the form of a potentiometer for setting a desired speed of the electric motor 29 of the tool 1. A computer program can be executable on the microcontroller 30 performing the respective control algorithms for controlling the electric motor 29. Besides the shown components 12, 30 and 34 the control unit 6 can also comprises numerous other electronic components (resistors, coils, capacitors, etc.), for example transformer means 28.

Of course, the tool 1 cannot be operated with any kind of control unit 6. The control unit 6 to be attached to the tool 1 has to be adapted and approved for operating the tool 1. This means that in particular the electrical properties of the control unit 6 have to correspond to the electrical properties the tool 1 requires. There are a number of possibilities for assuring that only control units 6 adapted and approved for use with a certain tool 1 are attached to the tool 1. The easiest way is to provide for some kind of mechanical key means at the receiving section 7 and the attachment section 9. The key means are designed such that only control units 6 and tools 1 with corresponding compatible key means can be attached to one another and properly function after attachment. Furthermore, the key means could also be realized electronically. In this case the tool 1 or the control unit 6 transmits a certain key signal which is received and processed by the control unit 6 or the tool 1. According to the results of the signal processing the control unit 6 and the tool 1 can function properly together or not. Even if proper attachment of the control unit 6 to the tool 1 was possible from a mechanical point of view, it could well be that the control unit 6 and the tool 1 cannot co-operate properly with one another from an electrical point of view because they are not adapted or approved to work together. The tool 1 or the control unit 6 analyzing the key signal received form the other component (control unit 6 or tool 1) would recognize that the key signal does not correspond to a pre-defined expected signal and would electronically block co-operation of the two components 1, 6.

Furthermore, a more sophisticated solution suggests that the control unit 6 is provided with means for automatically detecting the type of tool 1 the control unit 6 is attached to and means for automatically adjusting control parameters of the control unit 6 based on the detected type of tool 1. According to this embodiment the control unit 6 can be used for various tools 1 of different type, in particular with different technical characteristics in terms of electrical properties (e.g. nominal voltage, nominal current, maximum power consumption, data format of transmitted signals, etc.) and in terms of the type of control signal determined by the control unit 6 for driving the electric motor 29 (e.g. PWM-signal, continuous analogue signal). When attaching the control unit 6 to the tool 1, the control unit 6 automatically determines the type of tool 1 it is connected to. After having determined the type of tool 1, the control unit 6 procures the corresponding mechanical and/or electrical properties of the tool 1 and adapts the control parameters accordingly. Alternatively the detection of the tool type could also comprise the transmission of the respective mechanical and/or electrical properties from the tool 1 to the control unit 6. Adapting the control parameters also comprises adaptation of a closed loop control strategy, limiting or enhancing the maximum rotational speed of the motor depending on the desired speed of the working element, adapting the output voltage and/or current, adapting the control signal for the motor, or the like. The detection of the type of tool 1 can be realized electrically (receiving and analyzing an electrical signal containing information representing a unique identification of the type of tool 1), by radio (receiving and analyzing a radio signal containing information representing a unique identification of the type of tool 1), mechanically (detecting and analyzing mechanical properties of the tool 1 indicative of the type of tool 1), magnetically (detecting and analyzing a magnetic field induced by the tool 1), optically (receiving and analyzing an optical signal containing information representing a unique identification of the type of tool 1), inductively (receiving and analyzing a signal transmitted inductively from the tool 1 to the control unit 6, containing information representing a unique identification of the type of tool 1), by means of a capacitance (receiving and analyzing a signal transmitted capacitively from the tool 1 to the control unit 6, containing information representing a unique identification of the type of tool 1) or in any other way.

As already mentioned above, the present invention refers to any kind of electrically driven hand held and/or hand guided tool 1. Besides the polisher 1 shown in the figures, the electric power tool could also be one of but not limited to a grinder, a sander, a planner, a joining machine, an edge trimmer, a vertical router, a saw, a glazing machine, a scaring machine, a drill, a screw driver, or an electric mixer.

Of course, the various features of the embodiments described above, in particular the different solutions for designing the mechanical attachment means including the securing means and/or the electrical connection means interacting between the control unit 6 and the tool 1, can be freely combined with one another in order to arrive at embodiments of the present invention not explicitly mentioned and described herein, even if not explicitly mentioned.

THE SCOPE OF THE INVENTION

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

What I claim is:

1. Motor control unit (6) adapted for controlling an electronically driven hand held and/or hand guided tool (1) comprising a housing (2) and a working element (3) located outside the housing (2), the housing (2) containing an electric motor (29) and a gear mechanism for translating a rotational movement of the electric motor (29) into an actuation movement of the working element (3), wherein the motor control unit (6) is embodied separately from the housing (2) and that the motor control unit (6) comprises means (9; 16) for mechanically attaching the motor control unit (6) to the housing (2) and means (18; 23, 24) for electrically connecting the motor control unit (6) to electronic components (19; 29, 31, 32) of the electronically driven hand held and/or hand guided tool (1) for operation of the electronically driven hand held and/or hand guided tool (1), characterized in that the motor control unit (6) comprises an electric cable (10) for connecting the motor control unit (6) to an electric mains power supply and power transformer means (28) for transforming the energy originating from the mains power supply into energy suitable for operating the electric motor (29) of the electronically driven hand held and/or hand guided tool (1), to which the motor control unit (6) is attached, and in that the motor control unit (6) comprises a switch (12) for activating and deactivating the electric motor (29) of the electronically driven hand held and/or hand guided tool (1).

2. Motor control unit (6) according to claim 1, wherein the motor control unit (6) comprises an actuator (34) for setting a desired speed of the electric motor (29) of the electronically driven hand held and/or hand guided tool (1), to which the motor control unit (6) is attached.

3. Motor control unit (6) according to claim 1, wherein the motor control unit (6) comprises means for automatically detecting the type of electronically driven hand held and/or hand guided tool (1), to which the motor control unit (6) is attached, and means for automatically adjusting control parameters based on the detected type of electronically driven hand held and/or hand guided tool (1).

4. Motor control unit (6) according to claim 1, wherein the means (9; 16) for mechanically attaching the motor control unit (6) to the housing (2) comprise a snap-action connection device (26, 27), a latch connection device (21), a magnetic holding device and/or a manually activated securing device for holding the motor control unit (6) in respect to the housing (2), when the motor control unit (6) is attached to the housing (2).

5. Motor control unit (6) according to claim 1, wherein the means (18; 23, 24) for electrically connecting the motor control unit (6) to the electronically driven hand held and/or hand guided tool (1) comprise a plurality of contacts adapted to interact with corresponding contacts (17; 24, 23) located at the housing (2) in order to transmit electric signals between the motor control unit (6) and the electronically driven hand held and/or hand guided tool (1).

6. Motor control unit (6) according to claim 5, wherein the means (18; 23, 24) for electrically connecting the motor control unit (6) to the electronically driven hand held and/or hand guided tool (1) comprise contacts for connecting the electronically driven hand held and/or hand guided tool (1) to an electric power supply, at least one contact for receiving an electric signal from the electronically driven hand held and/or hand guided tool (1) for the detection of the type of electronically driven hand held and/or hand guided tool (1), to which the motor control unit (6) is attached, and/or at least one contact for receiving one or more sensor signals from one or more sensors (31) of the electronically driven hand held and/or hand guided tool (1).

7. Electronically driven hand held and/or hand guided tool (1) comprising a housing (2) and a working element (3) located outside the housing (2), the housing (2) containing an electric motor (29) and a gear mechanism for translating a rotational movement of the electric motor (29) into an actuation movement of the working element (3) and the electronically driven hand held and/or hand guided tool (1) comprising a motor control unit (6), wherein the motor control unit (6) is embodied separately from the housing (2) and that the motor control unit (6) comprises means (9; 16) for mechanically attaching the control unit (6) to the housing (2) and means (18; 23, 24) for electrically connecting the motor control unit (6) to the electronically driven hand held and/or hand guided tool (1) for operation of the electronically driven hand held and/or hand guided tool (1), characterized in that the motor control unit (6) comprises an electric cable (10) for connecting the motor control unit (6) to an electric mains power supply and power transformer means (28) for transforming the energy originating from the mains power supply into energy suitable for operating the electric motor (29) of the electronically driven hand held and/or hand guided tool (1), to which the motor control unit (6) is attached, and in that the motor control unit (6) comprises a switch (12) for activating and deactivating the electric motor (29) of the electronically driven hand held and/or hand guided tool (1).

8. Electronically driven hand held and/or hand guided tool (1) according to claim 7, wherein the motor control unit (6) comprises an actuator (34) for setting a desired speed of the electric motor (29) of the electronically driven hand held and/or hand guided tool (1), to which the motor control unit (6) is attached.

9. Electronically driven hand held and/or hand guided tool (1) according to claim 7, wherein the electronically driven hand held and/or hand guided tool (1) comprises means (32) for transmitting information regarding the type of electronically driven hand held and/or hand guided tool (1) to the motor control unit (6).

10. Electronically driven hand held and/or hand guided tool (1) according to claim 7, wherein the housing (2) has a recess (7) for receiving the motor control unit (6) and the motor control unit (6) has a casing (8), the form of at least part (9) of the casing (8) corresponding to the form of the recess (7) in order to allow insertion of the at least one part (9) of the control unit's casing (8) into the recess (7).

11. Electronically driven hand held and/or hand guided tool (1) according to claim 7, wherein the electronically driven hand held and/or hand guided tool (1) comprises one of a grinder, a polisher, or a sander.

12. Electronically driven hand held and/or hand guided tool (1) according to claim 11, wherein the gear mechanism and working element (3) are embodied such that the working element (3) performs a rotational, an orbital, a random orbital, a roto-orbital, or a planetary actuating movement.

13. Motor control unit (6) according to claim 2, wherein the motor control unit (6) comprises means for automatically detecting the type of electronically driven hand held and/or hand guided tool (1), to which the motor control unit (6) is attached, and means for automatically adjusting control parameters based on the detected type of electronically driven hand held and/or hand guided tool (1).

14. Motor control unit (6) according to claim 1, wherein the means (9; 16) for mechanically attaching the motor control unit (6) to the housing (2) comprise a snap-action connection device (26, 27), a latch connection device (21), a magnetic holding device and/or a manually activated securing device for holding the motor control unit (6) in respect to the housing (2), when the motor control unit (6) is attached to the housing (2).

15. Motor control unit (6) according to claim 1, wherein the means (18; 23, 24) for electrically connecting the motor control unit (6) to the electronically driven hand held and/or hand guided tool (1) comprise a plurality of contacts adapted to interact with corresponding contacts (17; 24, 23) located at the housing (2) in order to transmit electric signals between the motor control unit (6) and the electronically driven hand held and/or hand guided tool (1).

16. Electronically driven hand held and/or hand guided tool (1) according to claim 8, wherein the electronically driven hand held and/or hand guided tool (1) comprises means (32) for transmitting information regarding the type of electronically driven hand held and/or hand guided tool (1) to the motor control unit (6).

17. Electronically driven hand held and/or hand guided tool (1) according to claim 8, wherein the housing (2) has a recess (7) for receiving the motor control unit (6) and the motor control unit (6) has a casing (8), the form of at least part (9) of the casing (8) corresponding to the form of the recess (7) in order to allow insertion of the at least one part (9) of the control unit's casing (8) into the recess (7).

18. Electronically driven hand held and/or hand guided tool (1) according to claim 8, wherein the electronically driven hand held and/or hand guided tool (1) comprises one of a grinder, a polisher, or a sander.

19. Electronically driven hand held and/or hand guided tool (1) according to claim 9, wherein the electronically driven hand held and/or hand guided tool (1) comprises means (32) for transmitting information regarding the type of electronically driven hand held and/or hand guided tool (1) to the motor control unit (6).

20. Electronically driven hand held and/or hand guided tool (1) according to claim 9, wherein the housing (2) has a recess (7) for receiving the motor control unit (6) and the motor control unit (6) has a casing (8), the form of at least part (9) of the casing (8) corresponding to the form of the recess (7) in order to allow insertion of the at least one part (9) of the control unit's casing (8) into the recess (7).

* * * * *